Sept. 20, 1971  J. R. BARKER  3,606,360
JOINT-MAKING GASKETS
Filed Oct. 8, 1969
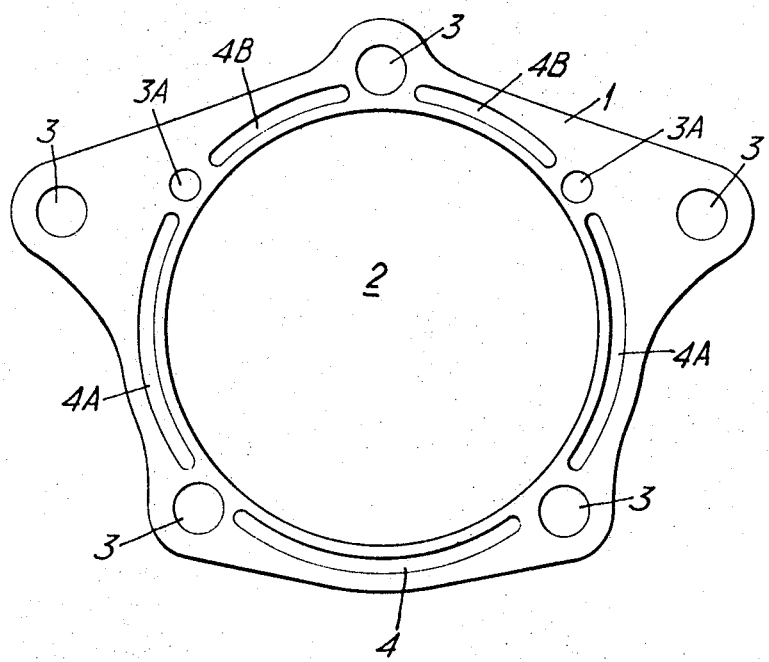
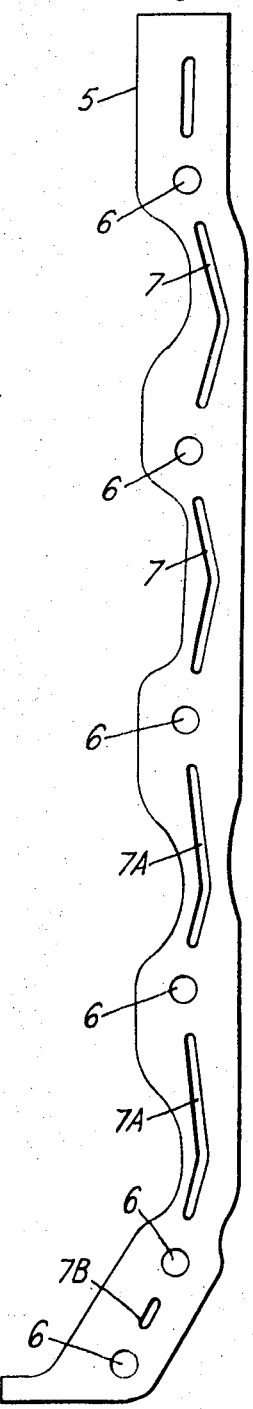
Inventor
J. R. BARKER
By
Hakomke, Werkerville Briebois
Attorneys

United States Patent Office 3,606,360
Patented Sept. 20, 1971

3,606,360
JOINT-MAKING GASKETS
John R., Barker, Leamington Spa, England, assignor to British Leyland (Austin-Morris) Limited (formerly The British Motor Corporation Limited), Longbridge, Birmingham, England
Filed Oct. 8, 1969, Ser. No. 864,800
Claims priority, application Great Britain, Oct. 15, 1968, 48,701/69
Int. Cl. F16j 15/08, 15/14
U.S. Cl. 277—227
1 Claim

ABSTRACT OF THE DISCLOSURE

A joint comprises a sealing gasket provided with bolt holes and slots in areas between the bolt holes subjected to less clamping pressure than the areas around the bolt holes. The slots are filled with a fluent sealing compound.

---

This invention relates to joint-making gaskets of the kind produced from sheet-like material, and having preformed holes for locating on clamping bolts or studs.

Gaskets of the kind in question are commonly used in many engineering applications that require joints to be rendered water-tight or oil-tight. In some cases, however, difficulty is experienced in meeting that requirement, especially when the designed spacing of the clamping bolts or studs is such as to leave intervening zones of the gasket insufficiently compressed; and when, moreover, joint-making has to be carried out in a flow-production manner (as, for example, in assembling motor vehicle power units and transmissions).

According to this invention a joint-making gasket of the kind specified above has slots arranged so that each extends between the zones of maximum clamping pressure established by successive bolts or studs, and the slots are initially or subsequently filled with a joining compound; with the result that, when the joint is made, the jointing compound creates liquid-tight barriers throughout those zones of the gasket in which the clamping pressure is less than the maximum. In this way satisfactory sealing of the joint in liquid-tight fashion is achieved without wastage of the jointing compound, since this is not applied where it is not needed, namely, in the zones of maximum clamping pressure in the vicinity of the bolts or studs.

The jointing compound may be applied by extruding it from a syringe into the slots of the gasket, or in any other convenient manner; for example, by using a brush as an applicator, or by employing an applicator similar to a rubber stamp.

If desired, the joint may be made with two of the allotted gaskets; the jointing compound being sandwiched between them so that it becomes extruded into the slots to create the requisite sealing barriers when the joint is made.

Two examples of joint-making gaskets embodying the invention are illustrated (in plan view) in FIGS. 1 and 2 of the accompanying drawings.

FIG. 1 shows a gasket 1 designed for making a joint around the periphery of a circular aperture 2. It is produced from sheet-like material (e.g. paper or thin card), and has preformed holes 3 and 3A for locating on clamping bolts or studs. It should perhaps be mentioned that it is quite immaterial that the two holes 3A, in this particular embodiment, happen to be of smaller diameter than the holes 3.

Arcuate slots 4, 4A and 4B, concentric with the aperture 2, are formed in the gasket and are arranged so that each extends between the zones of maximum clamping pressure established by successive bolts or studs. The slots are filled with a jointing compound, either before or after placing the gasket in position on the bolts or studs; with the result that, when the joint is made, the jointing compound creates liquid-tight barriers throughout those zones of the gasket in which the clamping pressure is less than the maximum.

FIG. 2 exemplifies the application of the invention to a strip-type gasket 5. This has preformed holes 6 for locating on clamping bolts or studs, and is formed with slots (as at 7, 7A and 7B) arranged so that each extends between the zones of maximum clamping pressure established by successive bolts or studs; these slots being filled with jointing compound before the joint is made.

I claim:
1. In a fluid-tight joint comprising two members positioned on opposite sides of a gasket made of sheet material and fastened together by a plurality of spaced clamping members which pass through holes in said gasket to establish zones of said gasket adjacent said holes which are subjected to maximum clamping pressure, said zones subjected to maximum pressure being spaced by zones subjected to lower pressure, the improvement according to which said last mentioned zones are pierced by slots extending through said sheets and between said first mentioned zones, said slots being filled with a fluent sealing compound.

References Cited
UNITED STATES PATENTS

| | | | |
|---|---|---|---|
| 1,853,175 | 4/1932 | Oven | 277—235(B) |
| 1,968,365 | 7/1934 | Bailey | 277—235(B) |
| 2,092,231 | 9/1937 | Victor | 277—235(B) |
| 2,127,372 | 8/1938 | Victor et al. | 277—227 |

ROBERT I. SMITH, Primary Examiner

U.S. Cl. X.R.
277—166